United States Patent [19]

Perona

[11] Patent Number: 5,894,377
[45] Date of Patent: Apr. 13, 1999

[54] TRAY LOADING CARTRIDGE TAPE DRIVE FOR DIFFERENT SIZED CARTRIDGES

[75] Inventor: Mark W. Perona, San Diego, Calif.

[73] Assignee: Iomega Corporation, Roy, Utah

[21] Appl. No.: 08/874,175

[22] Filed: Jun. 13, 1997

[51] Int. Cl.[6] .................................. G11B 5/008
[52] U.S. Cl. ........................................ 360/94
[58] Field of Search ............................. 360/94, 96.5

[56] References Cited

U.S. PATENT DOCUMENTS

| | | | |
|---|---|---|---|
| 3,692,255 | 9/1972 | Von Behren | 242/192 |
| 5,329,410 | 7/1994 | Iwamot | 360/94 |
| 5,357,385 | 10/1994 | Shimizu | 360/94 |
| 5,493,459 | 2/1996 | Shiomi | 360/96.5 |
| 5,543,992 | 8/1996 | Hu et al. | 360/132 |
| 5,558,291 | 9/1996 | Anderson et al. | 242/336 |
| 5,606,471 | 2/1997 | Inoue | 360/94 |

*Primary Examiner*—A. J. Heinz
*Attorney, Agent, or Firm*—Woodcock Washburn Kurtz Mackiewicz & Norris LLP

[57] ABSTRACT

A tape drive system for use with a removable tape cartridge. The tape drive comprises a slidable tray that moves the tape cartridge into a load position within the disk drive and into an eject position out of the disk drive. The tray is adapted to accept one of three cartridge types each type having a different physical size. When a selected cartridge is inserted into the tray and the tray is loaded into the drive, the entire cartridge is automatically moved into the drive enclosure. After the cartridge is moved into the drive, a door attached to the tray closes behind the cartridge such that no portion of the cartridge protrudes from the drive.

24 Claims, 8 Drawing Sheets

TRAY LOADING CARTRIDGE TAPE DRIVE FOR DIFFERENT SIZED CARTRIDGES

BACKGROUND OF THE INVENTION

This invention relates to cartridge based data storage systems. More particularly, the invention relates to a cartridge based tape storage system that accepts a variety of cartridges having different physical dimensions.

Cartridge based tape and disk data storage devices have been in use in the computer industry for several decades. Primarily, the cartridge based tape storage devices have been used as sequential access devices, whereby new files are added to the tape by appending them to the last file stored on the tape. During that time, a number of tape cartridge styles emerged. One popular cartridge style is based on a design that is disclosed in U.S. Pat. No. 3,692,255 (Von Behren). That design employs two rotatable reels that are fixed within a rectangular housing. A length of tape is wound around the reels along a predetermined tape path, which extends along a front peripheral edge of the cartridge and across a tape access opening. A drive belt extends around drive belt rollers and contacts a portion of the tape on each reel to move the tape back and forth between the reels and across the tape access opening. A drive puck, positioned near the inside front of the cartridge, contacts a drive roller, which provides a mechanism to move the drive belt.

Tape cartridges and tape drives have become an increasingly important feature in computer systems. The popularity of tape cartridges is driven in part by the large storage capacities and low cost of storage they provide. In general, the storage capacity of a particular tape cartridge is dictated by a variety of factors including the length of tape, the width of the tape, the materials used to produce the tape and the recording density of the tape. Even with the cost and capacity advantages offered by tape storage solutions, the tape drive has primarily found use in computer systems as a back-up device, in which duplicates of files that were originally stored to a random access storage device, such as a hard disk drive, are stored for sequential access on a tape cartridge.

As with most popular computer devices, tape drives and cartridges evolved around industry standards. However, while standards can provide advantages such as compatibility they also bring design constraints. In particular, standards can impose constraints on the available design options used to increase storage capacity. For example, an early tape cartridge design standardized around a 5¼ inch form factor with a quarter inch tape width. As a result, storage capacity became constrained by the tape width and the length of tape that could fit within the 5¼ standard cartridge. Thus, other methods, such as improved recording densities, were needed to increase storage capacity.

All of the tape cartridges adhering to the original 5¼ inch standard had a number of physical characteristics in common to allow a particular tape to inter-operate among tape drives made by different manufacturers. For example, a tape access opening must be located in a particular location on the front of the tape cartridge to allow the read-write head to gain access to the tape. Additionally, the tapes employ an elastic belt that is wound around the tape spools to provide the tape movement, and a drive puck is provided to translate drive power to the belt. Accordingly, the puck must be in a standard fixed location to receive rotational power from standard drives.

As techniques were developed for increasing the recording density, the storage capacity of a given cartridge could be increased. Ultimately, recording densities continued to increased and a demand arose for a more convenient form factor, resulting in a new tape cartridge and drive standard. The new standard evolved around a smaller, 3½ inch form factor. As with the earlier 5¼ standard, the 3½ inch form factor required predefined head access opening locations and so on.

Even after the 3½ inch form factor became the form factor of choice for many computer users, the need for increased capacity continued to develop. In response to the increasing demands for capacity in a 3½ inch form factor, manufacturers developed a variety of cartridge geometries that adhered to the key compatibility aspects of the 3½ inch cartridge, such as head access location, but which provided additional tape capacity within a given cartridge. For example, U.S. Pat. Nos. 5,543,992 (Hu et al.) and 5,543,992 (Anderson et al.) each describe some of the more popular developments that have been used to increase the tape capacity of 3½ inch tape cartridges.

The Hu patent discloses a tape cartridge that increases tape length by increasing the interior volume of the tape cartridge and consequently the amount of space available for tape storage. Hu discloses a tape cartridge with a width and a tape interface that conform to the standard 3½ inch form factor tape cartridges. However, the length of the Hu cartridge is more than twice the length of an original 3½ inch tape cartridge. As a result, the Hu cartridge can contain up to four time the amount of tape as a conventional 3½ inch cartridge. A tape cartridge of this general form factor is manufactured by Gigatek Memory Systems, Carlsbad, Calif. A competing tape with a similar form factor is available under the TR-3 Extra brand name and is manufactured by Verbatim Corporation. For clarity, cartridges of this type will be referred to herein as extended mini-catridges.

The tape cartridge design disclosed in the Anderson patent takes a somewhat different approach from the Hu approach to expanding the amount of available tape within the tape cartridge. Anderson keeps the front portion of the cartridge width substantially the same as a standard 3½ inch mini cartridge and maintains the general tape interface configuration. However, the Anderson cartridge provides for both a wider and longer cartridge, though not as long as the extended mini-cartridge. By keeping the tape interface portion of the Anderson cartridge substantially the same as a standard 3½ inch mini-cartridge, tape drives can be produced that are capable of reading both the standard 3½ inch mini cartridge and the Anderson mini cartridge. A cartridge of this type is sold commercially under the TRAVAN™ brand name and is produced by 3M corporation. Notably, tape drives designed to accept the TRAVAN™ cartridges are also capable of accepting a standard 3½ inch mini cartridge and, in many cases, can also accept an extended mini-cartridge.

The Anderson tape system provides for a tape drive that accepts cartridges that have two different widths. Purportedly providing a structure that supports two different width sizes, the Anderson tape drive accepts different cartridges so long as the cartridges have head access openings and drive pucks in predefined locations. Accordingly, such a drive is commercially available that accepts TRAVAN™ style cartridges as well as other narrow 3½ inch mini-cartridges. However, a tape drive designed to read only standard (narrow) 3½ inch mini-cartridges is generally not capable of accepting a TRAVAN™ cartridge because of the TRAVAN™ cartridge width. But because the extended min-cartridge keeps the width of the mini-cartridge consistent with the width of a standard cartridge, a tape drive capable of reading a standard mini-cartridge would likely be able to accept an extended mini-cartridge as well.

In recent years, the TRAVAN™ style cartridge has become a very popular tape cartridge form factor. Accordingly, many of the commercially available tape drives are capable of accepting any of the three cartridge formats (i.e., standard 3½ inch mini cartridge, TRAVAN™ style mini cartridge and extended mini-cartridge). Cartridges according to the extended mini-cartridge form factor are generally capable of containing the most tape.

Although currently available tape drives, including drives incorporating the Anderson design, may accept a variety of tape cartridge form factors, they still have several significant drawbacks. For example, when used in connection with the extended mini-cartridge, the current tape drives present what has been referred to as the "tongue". That is, the extended mini-cartridge protrudes from the front of the tape drive. The tongue is not only unsightly, but is also undesirable for functional reasons. For example, when installed in a computer bay, an extended mini-cartridge may require several extra inches of clearance space. Unfortunately, this drawback of currently available tape drives has hindered the use of extended mini-cartridges and, consequently, the availability of higher storage capacities.

Therefore, there is a need for an improved tape drive that offers advantages over the prior art. The present invention provides such a tape drive.

SUMMARY OF THE INVENTION

The present invention is directed to a data storage device that accepts removable cartridges having a variety of form factors. The data storage device has an enclosure with an opening at one end. A cartridge inserted into the enclosure travels fully into the enclosure such that the entire cartridge is engulfed. A head, disposed within the enclosure, accesses media within the cartridge. The storage device also includes a motor within the enclosure that drives the media past said head. A tray is slidably coupled to the enclosure and is adapted to selectively accept one of at least two different sized removable cartridges. The tray slides to a first position to accept the cartridge and slides to a load position to move the cartridge into the drive enclosure opening and into an access position by the head and motor. A second motor, fixed within said enclosure, provides for automated movement of the tray into and out of the enclosure. And a door, which is coupled to the tray, closes over the opening in the enclosure when the tray moves a cartridge fully into the drive.

According to an aspect of the present invention, a latch member, coupled to either the tray and or the drive enclosure, locks the tray in the load position. And, an arm is rotatably coupled to the tray between a tape insertion position and a tape retention position. This arm retains the cartridge when the drive is operated in different orientations.

Preferably, the removable cartridges comprise a magnetic media such as magnetic tape.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENTS

The present invention provides a data storage apparatus having a slidable tray that accepts a cartridge for use with the data storage device. Throughout the description, the preferred embodiment of the invention is described as accepting a mini-cartridge of one of three types: standard, TRAVAN™, and extended. However, these mini-cartridges are presented for exemplary purposes only. It is not necessary that the tray system is used with these particular cartridges; rather, these mini-cartridges are currently preferred because of their widespread popularity. Accordingly, the tray concept should not be limited to these particular cartridge types as the invention contemplates the application of the tray concept to other cartridge types and configurations.

Figure 1:
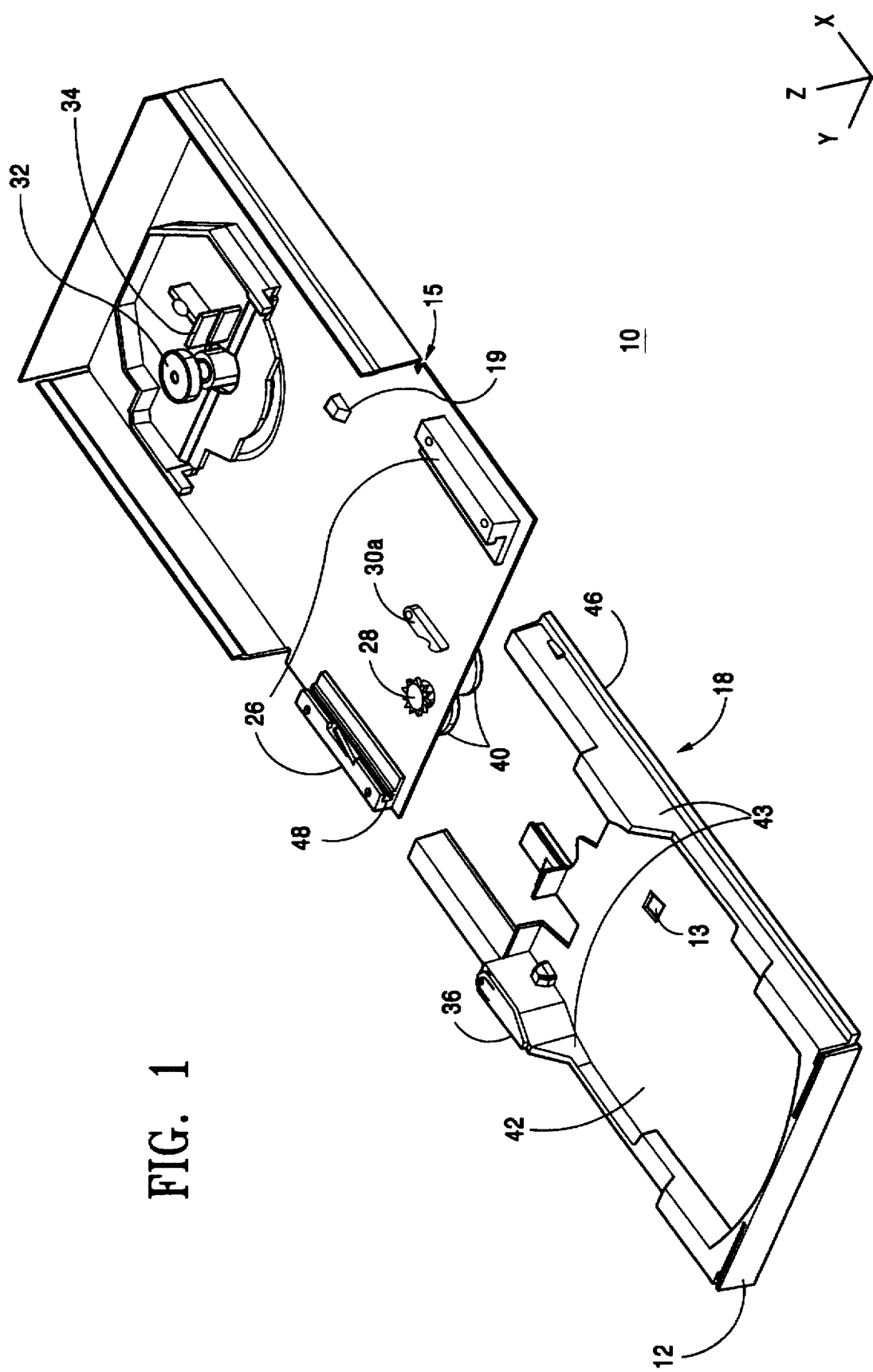
FIG. 1 is a diagram of a portion of the internal components of a tape drive according to the present invention.
Figure 2:
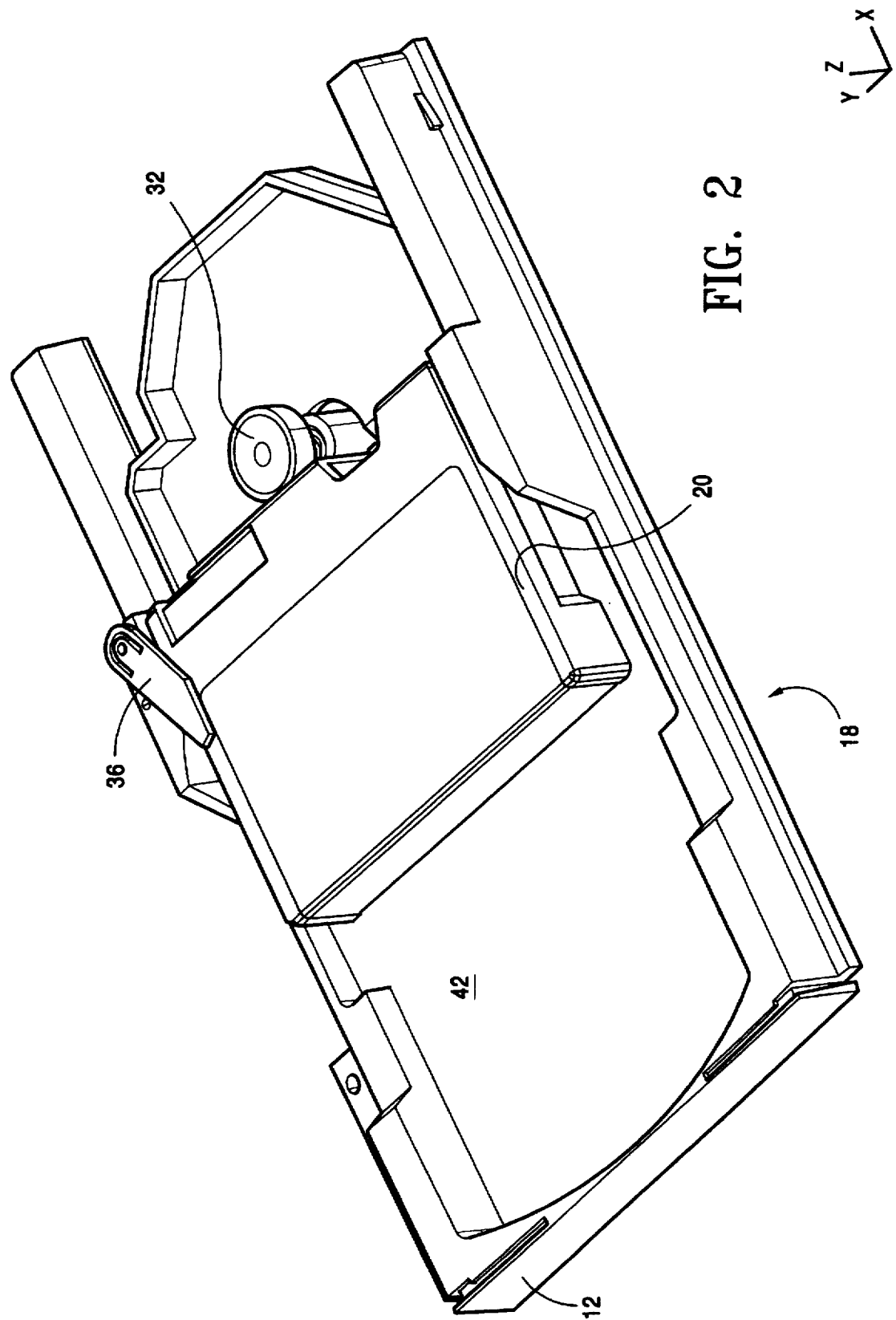
FIG. 2 is a diagram of a portion of the internal components of a tape drive with a mini-cartridge loaded into the drive.

Referring to FIGS. 1 and 2, portions of a data storage device in accordance with the present invention are shown. The drive components are illustrated without a drive enclosure to more clearly illustrate the major interior components of data storage device 10. As explained more fully below, the data storage device has two main components: a tape drive component 10; and a removable tape cartridge of the mini-cartridge variety, e.g., tape cartridge 20. A tray 18 is provided to move a tape cartridge between a load position for tape access and an eject position for inserting or removing a cartridge from the drive. When a mini-cartridge is loaded into tape drive 10, a user can store digital data to and retrieve digital data from the tape media within the mini-cartridge.

The main tape drive 10 electronic components shown are attached to a chassis 15. The electronic components include a drive roller 32 and a read-write head 34. Other drive electronic components are substantially similar to those employed in currently available tape drives and as such are well-known to those of ordinary skill in the arts. Accordingly, further details of those components are left out of the drawings and the description for clarity and brevity. Chassis 15 is preferably formed from molded plastic although sheet metal could also be used. Drive roller 32 is attached to a drive motor (not shown) and provides a mechanism for moving the magnetic tape, which is stored within cartridge 20, over read-write head 34 so that data can be read from or written to the tape media. Drive roller 32 and read-write head 34 are located proximate the back end of chassis 15. This positioning of the drive electronics permits the longest cartridge type, e.g., an extended mini-cartridge, to move fully into drive 10 before contacting read-write head 34.

Significantly, drive 10 features a tray 18 that has a flat pan 42 and side supports 43 that form a wall around pan 42. Pan 42 and side supports 43 combine to provide a formation in tray 18 that accepts and retains a mini-cartridge selected from one of three different physical shapes. For example and as described more fully below, the formation in tray 18 accommodates a standard 3½ inch mini-cartridge, a TRAVAN™ type mini-cartridge, or an extended type mini-cartridge. Preferably the tray is injection molded from plastic; however, other types of tray mechanisms are possible that would not be molded from plastic. For example, the concepts of accepting one of three different cartridge types and moving the cartridges completely within the drive enclosure could be accomplished with a frame mechanism rather than a tray. In such a case, a different material, such as steel, might work better. Door 12 is fixed to the front of tray 18 and closes over an opening in a drive enclosure as described below to provide an aesthetic appearance to drive 10 when the cartridge is fully inserted into drive 10.

Tray 18 is slidably attached to chassis 15 via a pair of guides 26, which are fixed to chassis 15 by a screw, rivet, glue, or other commonly known attachment methods. Alternatively, the guides could be integrally formed with the base. Each guide 26 has a guide groove 48 that mates with a corresponding guide rail 46 on tray 18. Consequently, guides 26 ensure that tray 18 follows a predetermined path as tray 18 slides into and out of chassis 15. Tray 18 slides to a first predefined eject position to allow access to tray 18 for a user to insert or remove a tape cartridge 20. Additionally, tray 18 slides to a second predefined load position to load a tape cartridge 20 into position for access by the drive electronics. The other features shown in FIG. 2, such as pinion 28, which provides mechanical power to automatically translate tray 18 along the predetermined path between the first and second predefined positions, and latch 30a, which provides a lock mechanism to lock tray 18 into the load position on guides 26, are described more fully below.

During operation of tape cartridge 20 the base of the cartridge must be consistently referenced to ensure proper operation of the tape drive system. The referencing need is complicated by the use of a loading tray because tolerances between such tray 18 and the chassis 15 are such that a consistent cartridge base reference may not be maintained. To provide the needed cartridge reference, chassis 15 contains a reference surface 19 and tray 18 contains a cartridge locator 13, which is cut through pan 42 or tray 18. When tray 18 is fully inserted into chassis 15, reference surface 19 mates with cartridge locator and provides a reference to the base of tape cartridge 20. Accordingly, tape cartridge 20 is referenced to chassis 15 rather than tray 18. Because reference surface 19 is referenced with respect to the chassis and not tray 18, tape cartridges 20 will have a consistent reference with respect to the drive electronics.

According to an aspect of the present invention, drive 10 is operable in horizontal orientation (i.e., the Z axis is perpendicular with respect to gravity, which is the orientation shown in the Figures) or a vertical orientation (i.e., the Y axis is perpendicular with respect to gravity). When tray 18 is in the horizontal orientation, the tape cartridge is restrained by side supports 43; however, when tray 18 is in the vertical orientation, side supports 43 alone are not sufficient to ensure the tape cartridge remains properly positioned, particularly when tray 18 is in an extended position. To enable drive 10 to properly operate in a vertical orientation, an arm 36 is rotatably attached to side support 43. Arm 36 rotates between a tape cartridge restraint position (as shown in FIG. 2) and a tape cartridge release position (as shown in FIG. 1). Consequently, when a user inserts a tape cartridge into tray 18 when it is in the extended position, arm 36 can be rotated over the tape cartridge (e.g., mini-cartridge 20), to the cartridge restraint position, holding it in position against tray 18. Arm 36 will then properly retain a tape cartridge in tray 18 while the tray moves along its predetermined path, thereby allowing tape drive 10 to operate in either a horizontal or vertical orientation. To remove a tape cartridge from tray 18, the operation is reversed. Arm 36 is moved to the cartridge release position.

Figure 3:
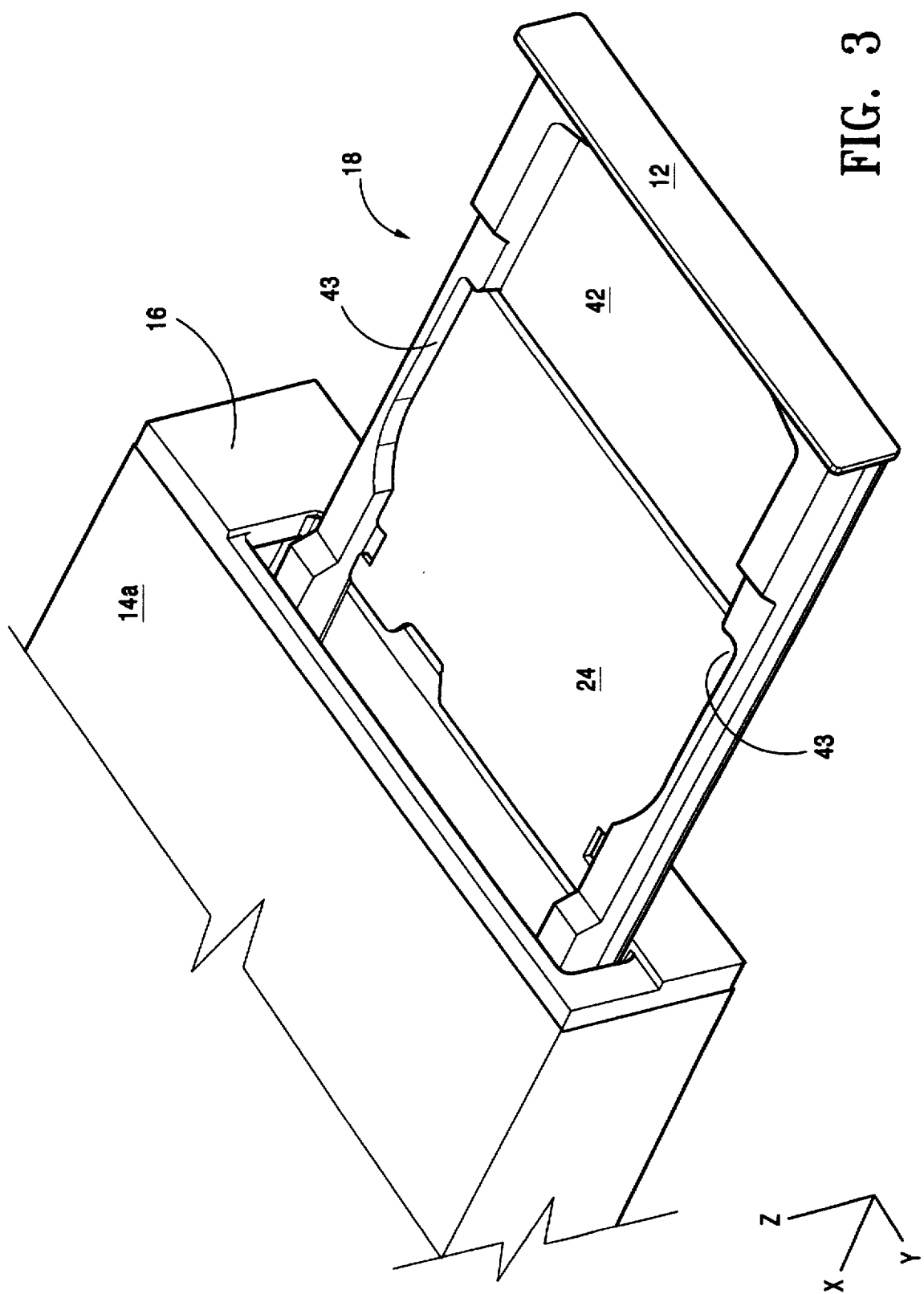
FIG. 3 is a diagram of the tape drive of the present invention with the tray in the eject position showing the location of a TRAVAN™ type mini-cartridge.
Figure 4:
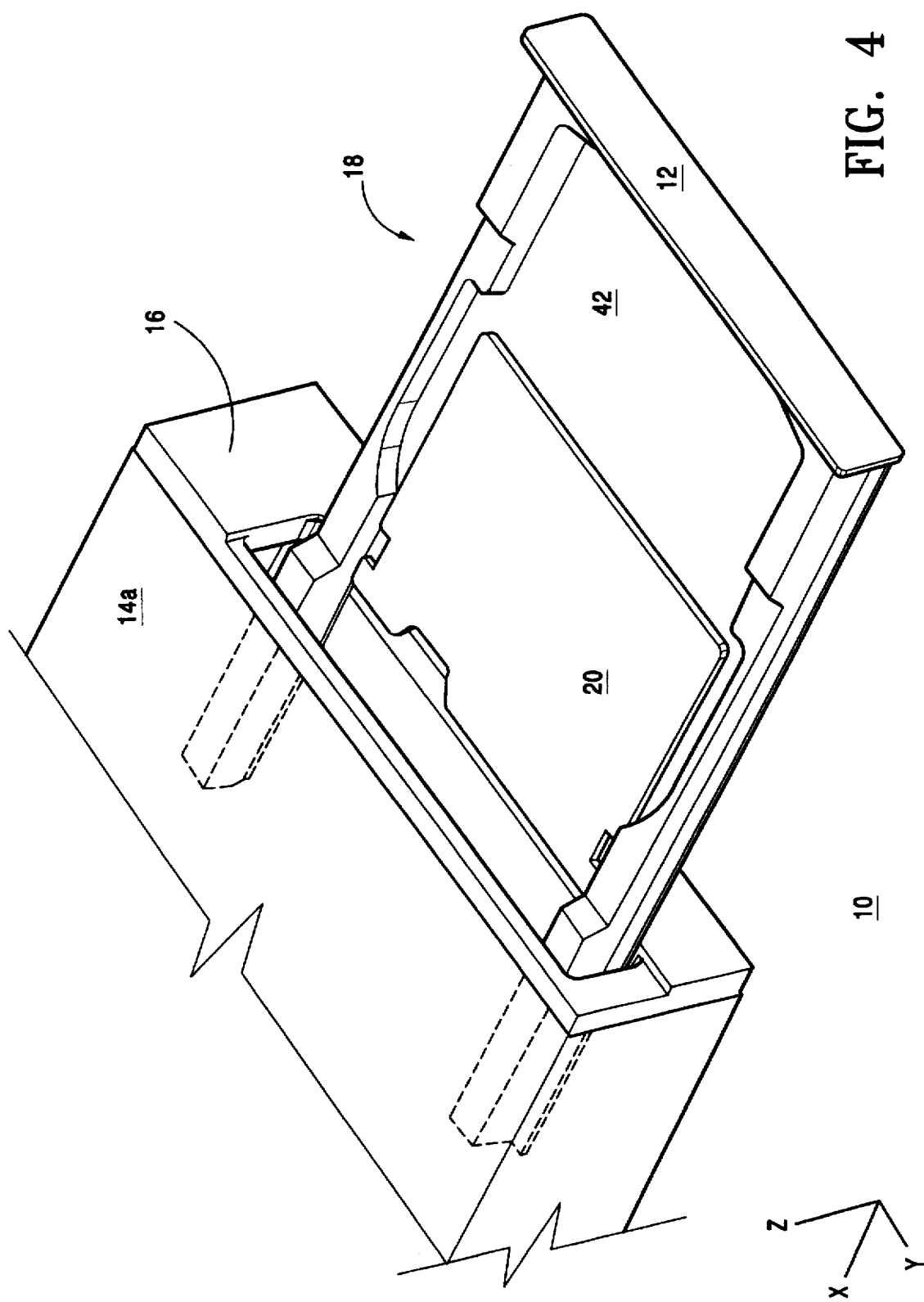
FIG. 4 is a diagram of the tape drive of the present invention with the tray in the eject position showing the location of a standard mini-cartridge.
Figure 5:
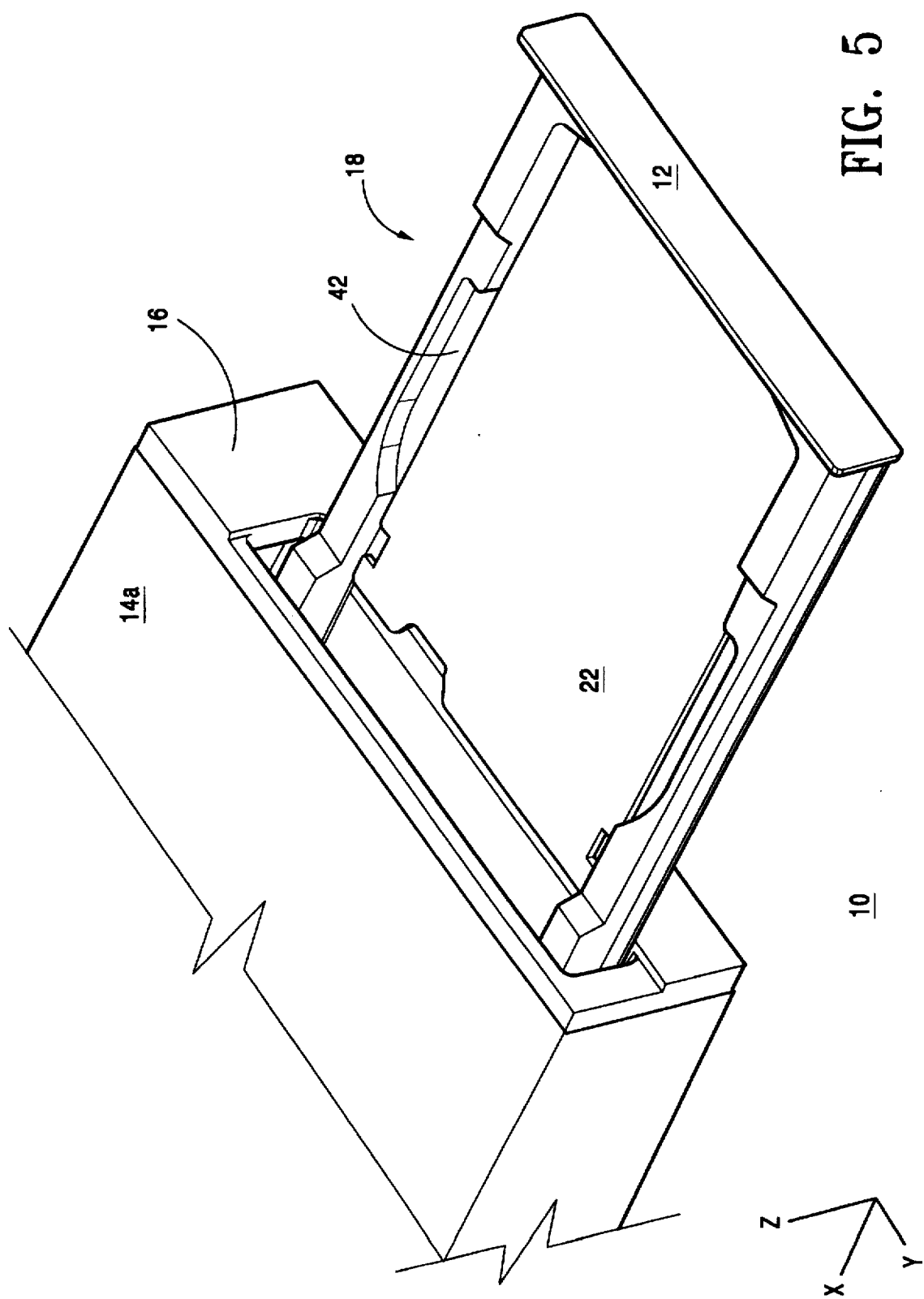
FIG. 5 is a diagram of the tape drive of the present invention with the tray in the eject position showing the location of an extended mini-cartridge.

A primary function of tray 18 is to provide a mechanism for moving a mini-cartridge into drive 10 to a load position and out of drive 10 to an eject position. The use of tray 18 with a mini-cartridge selected from the three mini-cartridge types mentioned above is best described with reference to FIGS. 3–6. FIGS. 3–5 show tray 18 in an eject position. In this position, tray 18 accepts a mini-cartridge conforming to one of three commonly used mini-cartridge dimensions. FIG. 3, for example, shows the general placement of a TRAVAN™ type of mini-cartridge within pan 42 of tray 18. Because the TRAVAN™ type of mini-cartridge is wider than the other mini-cartridge types, cut-outs 43 are provided in pan 42 to accommodate the expanded width size. FIG. 4, on the other hand, shows the general placement of a standard mini-cartridge 20 within pan 42. Because standard mini-cartridges have the smallest form factor of any of the mini-cartridges, the standard mini-cartridge fits within the cut-outs provided in pan 42 for the other mini-cartridge types. Finally, FIG. 5 shows the general placement of an extended mini-cartridge 22 in pan 42. Because this is the longest of the mini-cartridges accommodated by the presently preferred embodiment, this type of mini-cartridge dictates the overall length of pan 42 and, consequently, tray 18.

Figure 6:
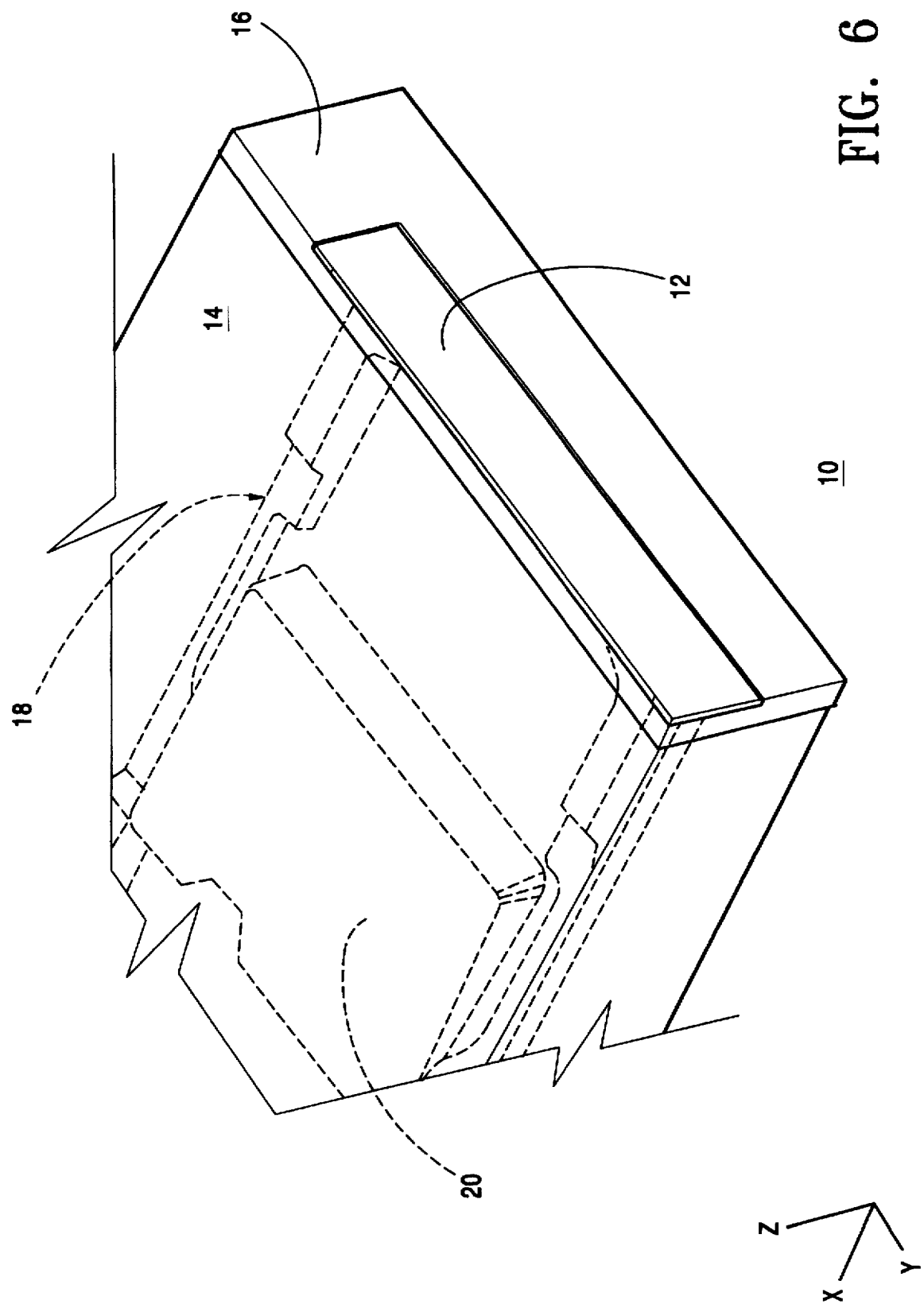
FIG. 6 is a diagram of the tape drive of the present invention with the tray in the load position showing the enclosing of the mini-cartridge within the drive.

FIG. 6 shows tray 18 fully inserted into drive 10, using a standard mini-cartridge 20 to illustrate the relative location of a tape cartridge within drive 10. Tray 18 is in the load position with mini-cartridge 20 in proper position for tape access by read-write heads 34. In this position, mini-cartridge 20 is completely engulfed by a drive enclosure 14, and door 12 is completely closed within bezel 16. Significantly, with tray 18 in the fully inserted position, drive 10 presents the same external appearance regardless of the dimensions of the inserted mini-cartridge. Thus, even when the longest mini-cartridge is inserted into drive 10, i.e., extended min-cartridge 22 of FIG. 5, no portion of the mini-cartridge sticks out of tape drive 10.

Figure 7:
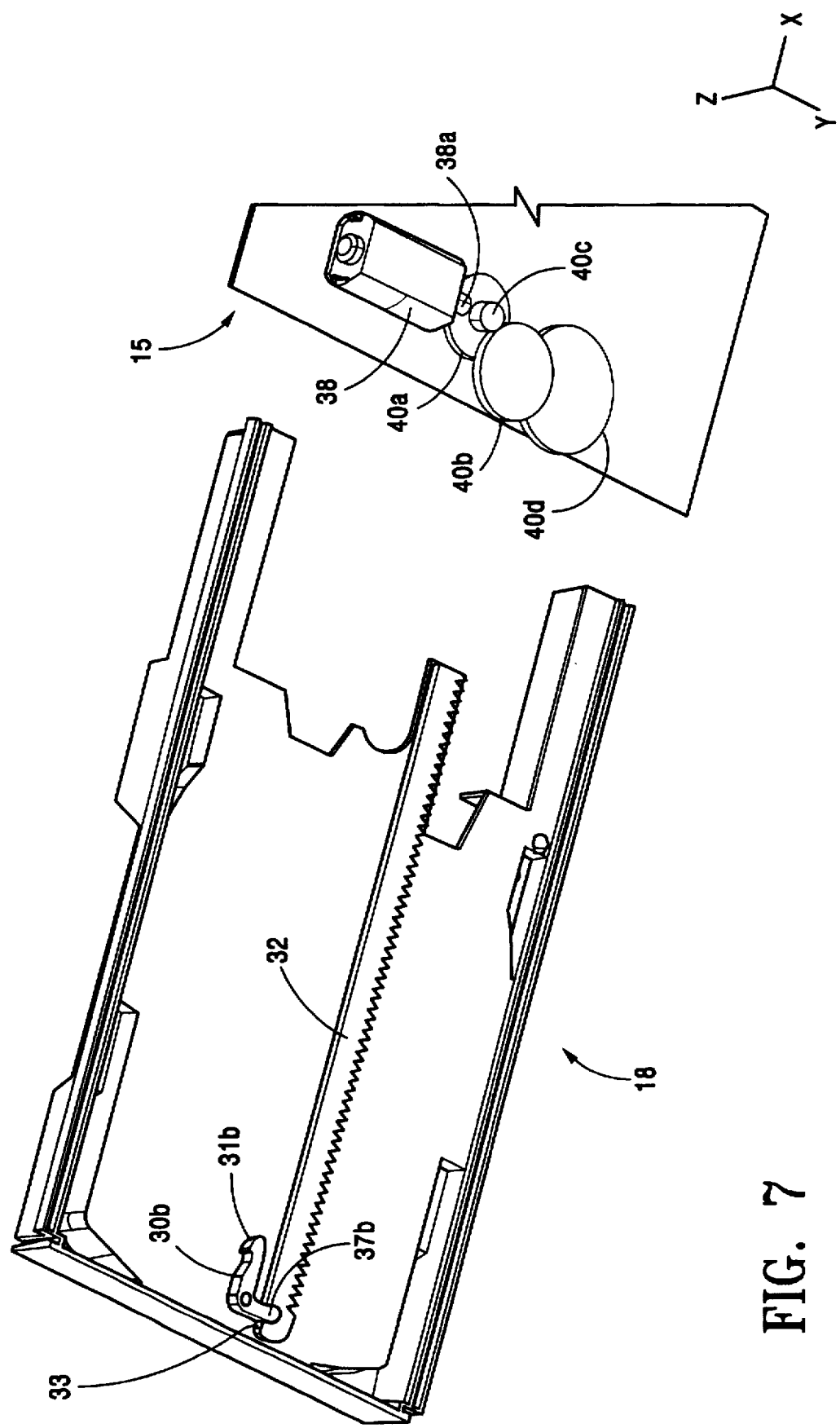
FIG. 7 is a diagram of the bottom of the tray showing the gearing for automated tray movement; and, FIG. 8 is a more detailed diagram of the automated tray movement gearing and tray locking mechanism.
Figure 8:
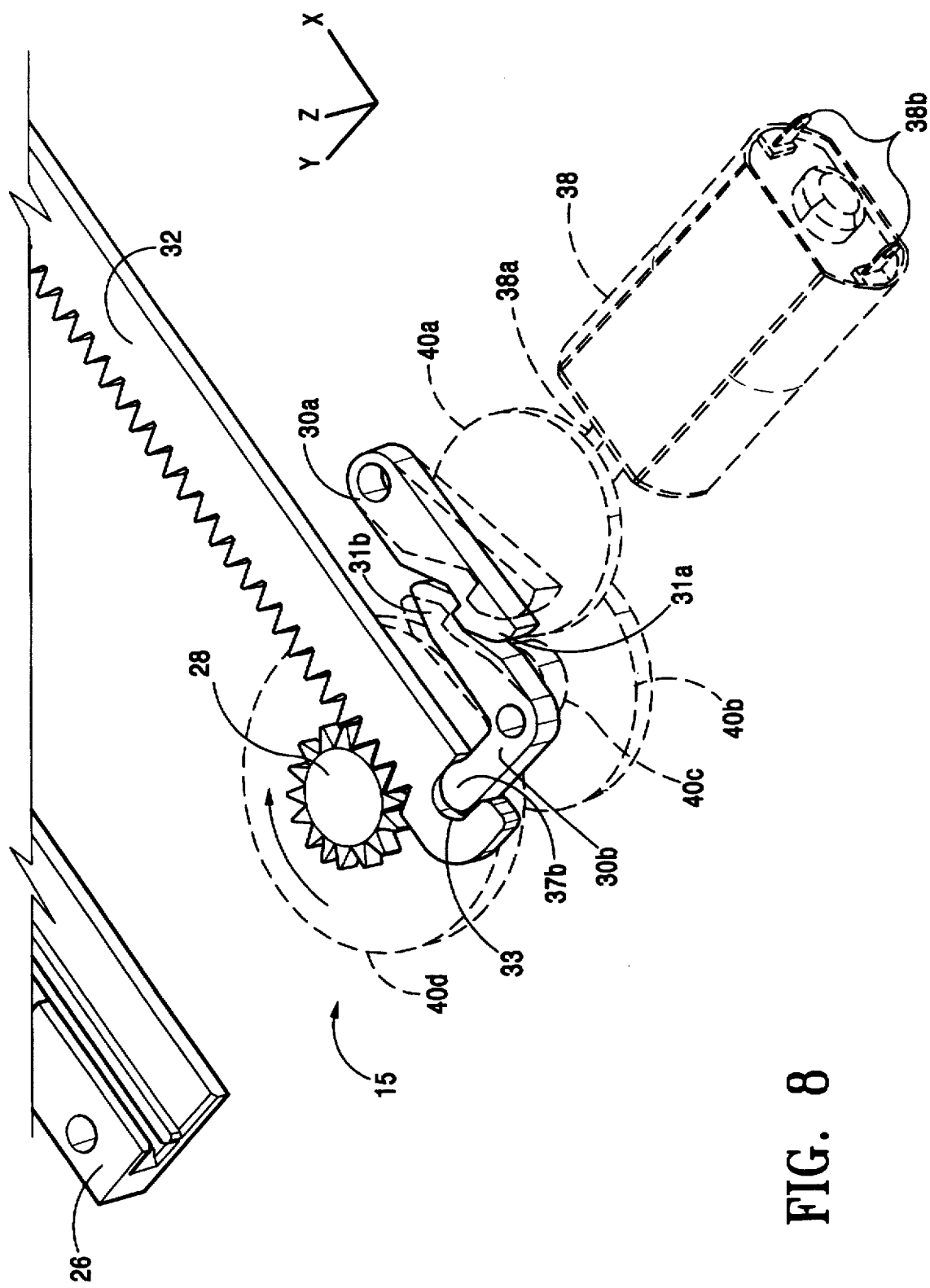

According to another aspect of the invention, a mechanism is provided for automatically moving tray 18 between load and eject positions. To provide this automated movement mechanism, drive 10 includes a motor, which is in mechanical communication with tray 18. Accordingly, when the motor is energized, mechanical power is provided to move tray 18. FIGS. 7 and 8 illustrate the preferred gearing, latching and motor configuration that provide the automated tray load and tray eject functions. Referring first to FIG. 7, the bottom of tray 18 is shown. A rack 32 is fixed along the length of the bottom of tray 18, proximately bisecting the length of tray 18. A latch 30b is rotatably attached on the bottom of tray 18. A lobe 37b of latch 30b is disposed within a cutout 33 proximate an end of rack 32. A hook-like portion (hereinafter a hook end) 1b is formed on the distal end of latch 30b and, as described below, is adapted to lock tray 18 into drive 10 when the tray moves into the load position. FIG. 7 also shows the bottom side of chassis 15, including the relative placement of motor 38 and gears 40. The operation of those gears is best described in reference to FIG. 8.

FIG. 8 shows a top perspective view of chassis 15 engaging portions of tray 18 (particularly, rack 32 and latch 30b). Tray 18 has been omitted from the drawing to enable a better description of the operation of the gears and latches. Pinion 28 is located on drive chassis 15 proximate the front of drive 10 near the enclosure opening. There, the teeth of rack 32 mesh with the teeth of pinion 28. As a result, when pinion 28 rotates clockwise (as viewed from above), rack 32 translates laterally (i.e., along the X-axis) causing tray 18 to move toward the predefined eject position. On the other hand, when pinion 28 rotates counter-clockwise, rack 32 and attached tray 18 move toward the predefined load position (as shown in FIG. 8).

Pinion 28 is driven by motor 38 and gear train 40. Intermediate gears 40a, 40b, 40c, and 40d (teeth not shown for clarity), respectively, translate the rotational power of motor shaft 38a to pinion 28. Thus as power (not shown) is supplied to motor terminals 38b, motor shaft 38a rotates. The motor shaft rotation is then transferred via gears 40a, 40b, 40c, and 40d to pinion 28 causing it to rotate. The direction of rotation of motor shaft 38a, and consequently pinion 28, is dictated by the polarity of electrical power supplied to motor terminals 38b. So that, the direction of motor shaft 38a is changed by reversing the polarity of power supplied to motor terminals 38b.

As noted above, tray 18 locks into position when in the load position in drive 10. Thereafter, tray 18 will remain in the load position even after power is removed from the drive. The primary lock mechanism is provided by latches 30a and 30b. Rack 32 and latch 30b are shown in FIG. 8 locked in the fully loaded position. In that position, hook end 31b of latch 30b mates with a corresponding hook end 31a of latch 30a. Latch 30a is rotatably attached to chassis 15 and constrained to movement between a position proximate the locked position and a position proximate the unlocked position (shown in phantom). A spring mechanism (not shown) provides a bias upon latch 30a) toward the locked position. Accordingly, in the locked position the spring bias keeps the latches engaged and locked.

The unlocking operation of latches 30a and 30b is best described starting from the locked position (as shown in FIG. 8). During the eject sequence, pinion 28 begins rotating clockwise, thereby urging, rack 32 out toward the eject position. The movement of rack 32 causes cut-out 33 to engage lobe 37b of latch 30b, causing latch 30b to rotate toward the counter-clockwise direction. When latch 30b rotates counter-clockwise to the unlock position (shown in phantom), tray 18 is unlocked and allowed to move with rack 32 to the eject position.

During loading, the locking operation of latches 30a and 30b operates as the tray moves from the eject position toward the load position. As latches 30a and 30b move to engagement, their respective hook ends engage first. By contrast to the unlocking operation, however, latch 30b is prevented from rotating due to the force applied by rack 32 via cut-out 33. Instead, the cammed front of hook end 31b engages the cammed front of hook end 31a. As a result, latch 30a is forced to rotate counter-clockwise against the spring bias to the position shown in phantom. After the tray moves to the fully loaded position, the respective hook ends will be in a position to lock and the spring bias will force latch 30a clockwise into locked engagement with latch 30b.

In summary, a tape drive has been described which provides an automated tray for moving tape cartridges fully into a disk drive. The tray is adapted to accept a variety of cartridges having different physical dimensions. No matter which cartridge is loaded into the drive, the tray moves the cartridge fully into the enclosure and provides the same external appearance. Motor, gearing, latches are provided that operate the tray mechanism. Additionally, a rotatable arm is provided that improves the operation of the tape drive in a vertical orientation.

The above description of preferred embodiments is not intended to impliedly limit the scope of protection of the following claims. Thus, for example, except where they are expressly so limited, the following claims are not limited to applications involving tape drive systems.

What is claimed is:

1. A data storage drive for reading data from and writing data to a magnetic media in a removable cartridge, the cartridge being of a type having a head access opening and a drive motor access opening disposed in a front peripheral edge, said drive comprising:

a drive enclosure having an opening at one end;

a head disposed within said drive enclosure for accessing the magnetic media within the cartridge by way of the head access opening;

a drive motor disposed within said enclosure for driving said media past said head by way of the drive motor access opening in the peripheral edge of the cartridge; and, a tray slidably coupled to said drive enclosure, said tray being adapted to selectively accept one of at least two different sized removable cartridges, said tray being slidable to a first position for accepting the cartridge and being slidable to a second position for moving the cartridge into the drive enclosure opening for enabling access by said head and drive motor.

2. The data storage drive as recited in claim 1 further comprising a door coupled to said tray such that said door closes over the opening in said drive enclosure when said tray moves to said second position.

3. The data storage device as recited in claim 1 further comprising a motor fixed within said enclosure, said motor having a rotatable shaft in mechanical communication with said tray such that said tray moves into and out of said drive enclosure in response to rotation of said motor shaft.

4. The data storage device as recited in claim 1 wherein said magnetic media comprises magnetic tape.

5. The data storage device as recited in claim 4 wherein said at least two different sized removable cartridges have a media access opening in a first predetermined position.

6. The data storage device as recited in claim 1 further comprising a latch member coupled to one of said tray and said drive enclosure for locking said tray in said second position.

7. The data storage device as recited in claim 1 wherein said read-write heads are disposed within said enclosure proximate an end opposite said opening.

8. The data storage device as recited in claim 1 further comprising an arm rotatably coupled to said tray, said arm being rotatable between a cartridge insertion position and a cartridge retention position.

9. A data storage device for accepting one of at least two different sized removable cartridges that contain a magnetic media for storing digital data, said cartridges having a head access opening located a first predefined position in a peripheral edge of said cartridge and a drive motor access opening at a second predefined position along a peripheral edge of said cartridge, comprising:

a head assembly adapted to interface with said magnetic media;

a drive motor for driving said media past said head assembly;

a housing enclosing said head assembly and said drive motor, said housing having an opening that accepts a cartridge selected from one of the at least two different sized cartridges into said housing; and, a door operably coupled to said housing, said door moving to an open position for insertion and removal of at least two different sized cartridges into and out of said housing and moving to a closed position such that the at least two different sized cartridges are enveloped in said housing after said cartridges are inserted into said housing.

10. The data storage device as recited in claim 9, further comprising:

a tray operatively coupled to said housing and said door for moving the cartridges into said housing for interfacing with said head assembly, said tray accepting said one of at least two different sized cartridges.

11. The data storage device as recited in claim 9 further comprising a tray motor fixed within said housing, said tray motor having a rotatable shaft in mechanical communication with said tray such that said tray moves into and out of said drive enclosure in response to rotation of said rotatable shaft.

12. The data storage device as recited in claim 9 wherein said magnetic media comprises magnetic tape.

13. The data storage device as recited in claim 12 wherein said removable cartridges have a media access opening in a first predetermined position.

14. The data storage device as recited in claim 9 further comprising a latch member coupled to one of said tray and said drive enclosure for locking said tray in the closed position.

15. The data storage device as recited in claim 9 wherein said read-write heads are disposed within said enclosure proximate an end opposite said opening.

16. The data storage device as recited in claim 9 further comprising an arm rotatably coupled to said tray; said arm being rotatable between a cartridge insertion position and a cartridge retention position.

17. A tape drive for accessing a magnetic tape cartridge of a type having a head access opening and a drive motor access opening disposed in a front peripheral edge, comprising:

a read-write head;

a drive mechanism for moving the magnetic media over said read-write head;

a tray for moving said magnetic tape cartridge between a load and an eject position; and an arm rotatably coupled at its distal end to said tray and being rotatable between a first position over said cartridge and a second position away from said cartridge such that cartridges can be inserted and held in said tray when said tape drive is oriented in a position such that said cartridge is inserted in a vertical orientation.

18. A data storage drive for driving magnetic media in a removable cartridges of a type having a head access opening and a drive motor access opening disposed in a front peripheral edge said drive comprising:

a drive enclosure having an opening at one end;

a head disposed within said drive enclosure for accessing the magnetic media within the cartridge;

a drive motor disposed within said housing for driving said media past said head; and, a cartridge loading means coupled to said drive enclosure for moving a cartridge fully into said enclosure and into a load position for access of said magnetic media by said head and out of said enclosure for ejection of said cartridge, said cartridge loading means being adapted to selectively accept one of at least two different sized removable cartridges said cartridge loading means comprising a tray having a substantially planar surface, said tray having a cartridge locator hole through said planar surface such that a reference surface fixed to said chassis, projects through said locator hole to provide alignment of said cartridges independent of the tray.

19. The data storage drive as recited in claim 18 further comprising a motor means fixed within said housing and coupled to cartridge loading means for moving said cartridge loading means in response to rotation of said motor shaft.

20. The data storage drive as recited in claim 18 wherein said magnetic media comprises magnetic tape.

21. The data storage drive as recited in claim 20 wherein said removable cartridges have a media access opening in a first predetermined position.

22. The data storage drive as recited in claim 18 further comprising a latch means coupled to one of said tray and said drive enclosure for locking said tray in the load position.

23. The data storage drive as recited in claim 18 wherein said head is disposed within said enclosure proximate an end opposite said opening.

24. The data storage drive as recited in claim 18 further comprising an arm rotatably coupled to said tray, said arm being rotatable between a cartridge insertion position and a cartridge retention position.

* * * * *